Oct. 18, 1966   G. A. GROVE ETAL   3,279,048
METHOD OF MAKING A MOLDABLE WOOD FIBER MAT WITH METAL INSERT
Filed Feb. 1, 1963
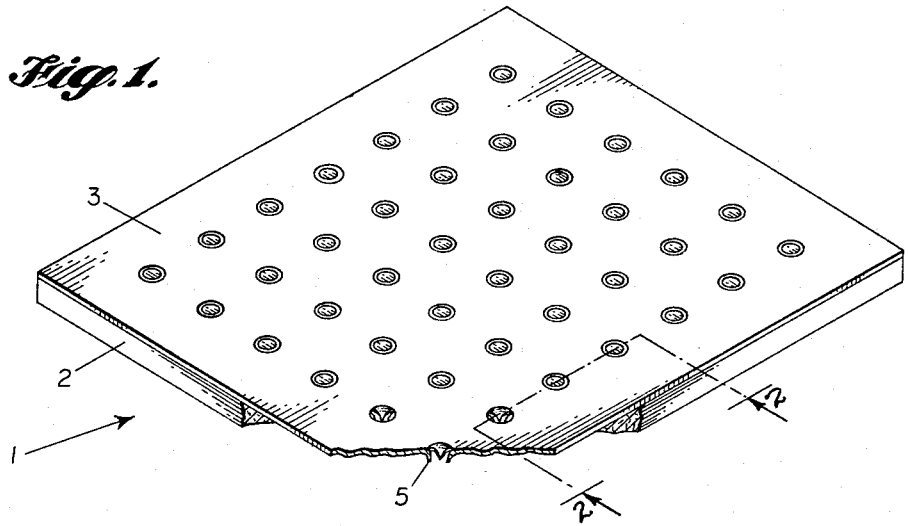
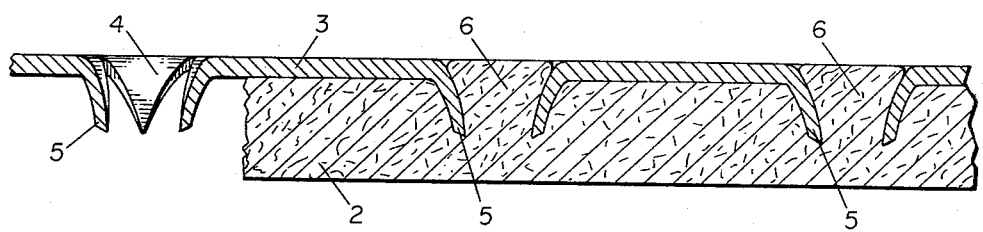
INVENTORS
GENE A. GROVE
PHILIP E. CARON
BY
ATTORNEYS

3,279,048
METHOD OF MAKING A MOLDABLE WOOD FIBER MAT WITH METAL INSERT

Gene A. Grove and Philip E. Caron, Longview, Wash., assignors to Weyerhaeuser Company, Tacoma, Wash., a corporation of Washington
Filed Feb. 1, 1963, Ser. No. 255,514
6 Claims. (Cl. 29—432)

This invention relates to an article of manufacture and a method of producing the same. More specifically, this invention relates to a reinforced moldable wood fiber mat and a method of combining the moldable mat with the reinforcing material.

There are many classes of moldable materials on the market today. The product generally comprises a quantity of comminuted cellulose material preferably defiberized lignocellulose. This is mixed with about 10%, preferably about 10% to about 40%, by weight of thermoplastic binder and a thermosetting resin, preferably about 1% to 15% by weight. The resulting molding mixture then is felted into a mat and prepressed to an intermediate compressed moldable fiber mat which has a density of at lease about 20 lbs. per cu. ft. This intermediate mat is subjected to the action of steam or other hot aqueous vapors and is molded to a preselected shape.

A variety of comminuted cellulose materials may be used as starting materials in the practice of the present invention. Although suitable materials include sawdust, shavings, wood fiber, and various chemicals produced, it is preferred to employ defiberized lignocellulose. This may be derived from any suitable source such as cane, straw, bark of trees, and the like but preferably is derived from the wood of trees of various species.

The resin binder system as a class used singly or in admixtures with each other are suitable for the purposes of the present invention, the particular binder employed being determined by the properties of strength, hardness, surface support desired in the molded product. Such materials include, for example, the various grades of asphalt and gilsonite; the thermoplastic cellulose ethers, including ethyl cellulose, benzyl cellulose and the like; the thermoplastic cellulose esters, such as cellulose acetate; the thermoplastic coumarones, the thermoplastic coumarone-indene resins; the thermoplastic polyvinyl resins, including polyvinyl acetate, polyvinyl chloride and co-polymers thereof; the thermoplastic alkyde resins; the thermoplastic polystyrenes; and rosin. The resinous condensation products of urea and an aldehyde and of a phenol and an aldehyde, for example, the phenol-formaldehyde resins, which at least in the preliminary stages of the pressing operation are thermoplastic in properties, are suitable as the thermosetting resins.

In general, this product is manufactured by the following process:

Step 1. Selecting sound whole wood for chips.

Step 2. Defiberizing the chips under carefully controlled conditions. This includes treating the chips with steam under carefully controlled pressure and temperature.

Step 3. Adding a selected resin binder system to the hot, moist fiber.

Step 4. Drying the fiber resin mixture under carefully controlled conditions which include the humidity under which the drying process is carried out to prevent curing of the thermosetting resin.

Step 5. Continuously felting the dried fibers into a thick, low density mat.

Step 6. Predensifying the continuous mat with steam and pressure to facilitate handling, shipping and conversion.

Step 7. Cutting the mats into piece sizes required by the converter and the ultimate consumer.

Step 8. Palletizing the pieces for shipment.

Since this material can be readily molded into various shapes and has relatively high strength characteristics and a relatively low cost per unit, it has enjoyed a substantial commercial success.

In frequent applications, the strengths of the molded fiber parts are insufficient to meet the service requirements of the part. The strength insufficiency might be the result of having to use overly thin or low density molded sections in the part under consideration.

Previous attempts have been made to improve strengths through modifications and variations in the binder system. The maximum strength values attainable in the better binder systems are similar and far below the values required for the potential uses.

Further attempts have been made to improve strengths through the addition of non-wood fibers such as fiberglass. Any small improvements obtained are insignificant in satisfying the requirements of some uses.

In still other cases some increased strength can be achieved through design modifications including ribbing and increasing part thickness or density. However, molding in ribs of any depth presents problems and increasing the density or thickness of an entire part to increase the strength of a particular section is usually uneconomical.

An object of this invention is to provide a method of forming a molded wood fiber part or mat having a reinforcing metal insert.

These objects and advantages will become manifestly clear to those skilled in the art when taken in conjunction with the following detailed description and drawings, wherein:

FIGURE 1 is a perspective view, partly in cross-section, of a moldable wood part having a metal plate molded thereto.

FIGURE 2 is a cross-sectional view taken on line 2—2 of FIGURE 1.

We have discovered that the strength of a molded part or mat can be substantially increased by fastening a member to a molded part such as a metal section or plate. The metal part is designed with disrupted holes similar to those in a grater. The metal section and moldable fiber mat are properly located in a forming die. While the part is being formed and densified, an integral union is achieved with the metal part. The moldable fiber is forced into the holes in the metal part and the "burred" metal is clinched to the densified molded part.

Referring to the drawings, a reinforced moldable wood fiber mat or part is generally indicated at 1. The wood fiber mat or part 1 generally consists of a wood fiber mat or part indicated at 2 and consists of a wood fiber and a resin binder system. A metal plate 3 having holes 4 therethrough is shown as being molded to the wood fiber mat or part 2. The metal plate 3 may have any desired thickness.

As shown more clearly in FIGURE 2, burrs 5 are formed around the hole 4 by punching the hole 4 with a nail or other similar object. When the metal plate 3 and wood fiber mat 2 are pressed or molded together under heat and pressure, a portion of the wood fiber mat 2 extends up through the hole and around the burred portion 5 as indicated at 6 to clinch the metal plate 3 to the wood fiber mat 2.

The basic process of this invention comprises: conditioning the fiber mat or part in a standard steam chamber that activates the resin binder system and plasticizes the wood fiber, laying the metal part with the disrupted holes on the top of the fiber mat, and then pressing the two parts together with the same cycle and pressing conditions as though no metal part were placed on top of the fiber part or mat.

The above process can be carried out by pressing the metal plate to the moldable wood fiber part or mat when the wood fiber mat is being molded.

Alternately, if the wood fiber mats have already been manufactured and are in storage, the wood fiber mats are placed back into a steam atmosphere and treated to activate the resin binder system and plasticize the wood filler. Then the metal plate is molded thereto as outlined above.

The presently described process is illustrated further in the following:

EXAMPLE I

A 6" x 6" x .003" brass plate was perforated by puncturing with nails. The plate was punctured with five holes, one in each corner and one in the center. 6, 8 and 10 penny nails were used. A moldable wood fiber mat of the same size, i.e. 6" x 6", was placed in a preconditioning steam chamber, and then the brass piece and wood fiber mat were molded together to provide a strong well-bonded section.

EXAMPLE II

A brass shim stock piece 6 x 6 x .005" was perforated by puncturing with nails. Each plate was punctured with five holes, one in each corner and one in the center. 6, 8 and 10 penny nails were used. The brass plate or piece and a piece of fiber mat were molded together using the same technique used in Example I to provide a strong well-bonded section.

EXAMPLE III

A 3 x 6 x .050" aluminum plate was perforated with a 10 penny nail. Only one half or end of the piece was punctured. 49 holes on ⅜" centers were made. The plate was then positioned on the edge of the fiber mat in a press, the perforated section on the mat and the unperforated section off the mat. The perforated section was bonded into the mat as noted in the first two examples. After removal from the press, the tab end could be formed to a desired shape, used for attaching to other structures, etc. The metal-to-fiber mat bond was far stronger than could be achieved with an equivalent number of rivets.

With this process a metal section and fiber mat can be integrated during the conventional fiber mat forming and curing cycle. Die designs will permit the use of unlimited shapes and sizes of metal parts that can be used in any desired enviroment.

It should be noted that the metal plates used with this invention are of a thin dimension and the holes therein are punched rather than drilled. When the plates are punched, the nail or the like used for the punching process will create burrs 5 on the undersurface of the metal plate. Accordingly, when the metal plate and the fiber mat are pressed together under heat and pressure the resin binder system in the fiber mat is activated and the wood fiber is plasticized and therefore the burrs will be pushed into the mat and a strong bond between the metal and the fiber mat will be created. In other words, the burrs around the holes are pushed into the activated resin binder system and the plasticized wood fiber, rather than flowing up into the hole as is well-known in the prior art.

While various specific examples of a preferred procedure employing the above invention have been described above, it will be apparent that many changes and modifications can be made in those methods of procedure without departing from the spirit of the invention. It should, therefore, be understood that the examples cited and the methods of procedure set forth above are intended to be illustrative only and are not intended to limit the scope of the invention.

What is claimed is:

1. A method of forming reinforced moldable wood fiber mats having a wood fiber and a resin binder system, comprising; punching a plurality of holes in a metal plate to form burrs on one side thereof; heating the fiber mat by steam to activate the resin binder system and plasticize the wood fiber; pressing the burrs on the metal plate into the heated fiber mats so that the holes become filled with the resin binder and wood fiber and the burrs clinched thereto; curing the mat between heated press platens.

2. A method of forming reinforced moldable wood fiber mats in accordance with claim 1 wherein the thickness of the metal plate is less than 10 thousandths of an inch.

3. A method of forming reinforced moldable wood fiber mats in accordance with claim 1 wherein said metal plate is aluminum.

4. A method of forming reinforced moldable wood fiber mats in accordance with claim 1 wherein said metal plate is brass.

5. A method of forming reinforced moldable wood fiber mats having a wood fiber and a resin binder system, comprising; punching a plurality of holes in an end portion of a metal plate to form burrs on one side thereof; heating the fiber mat by steam to activate the resin binder system and plasticize the wood fiber; pressing the burrs formed on the end portion of said metal plate into the heated fiber mat so that the holes become filled with the resin binder and the wood fiber and the burrs clinched thereto; curing the mat between heated press platens.

6. A method of forming reinforced moldable wood fiber mats in accordance with claim 5 wherein said metal plate is aluminum.

References Cited by the Examiner

UNITED STATES PATENTS

| | | | |
|---|---|---|---|
| 1,186,693 | 6/1916 | Siggins et al. | 264—257 X |
| 1,876,849 | 9/1932 | Bronson | 264—274 |
| 1,950,977 | 3/1934 | Evans | 264—273 X |
| 2,456,615 | 12/1948 | Berglund | 264—273 |
| 2,729,873 | 1/1956 | Ludwig | 264—273 |
| 2,777,787 | 1/1957 | Bragg | 161—59 |
| 2,777,788 | 1/1957 | Bragg | 161—59 |
| 2,808,098 | 10/1957 | Chavannes et al. | 264—112 X |
| 2,872,337 | 2/1959 | Heritage et al. | 264—112 X |
| 2,890,147 | 6/1959 | Pearson et al. | 264—112 X |
| 3,188,367 | 6/1965 | Gottschalk | 264—112 X |

ROBERT F. WHITE, *Primary Examiner.*

ALEXANDER H. BRODMERKEL, *Examiner.*

F. MARLOWE, L. S. SQUIRES, *Assistant Examiners.*